US010731019B2

(12) United States Patent
Zhang et al.

(10) Patent No.: US 10,731,019 B2
(45) Date of Patent: Aug. 4, 2020

(54) STABLE TWO COMPONENT SPRAY FOAM COMPOSITIONS CONTAINING HYDROHALOOLEFIN PROPELLANT OR BLOWING AGENT

(71) Applicant: DAP Products Inc., Baltimore, MD (US)

(72) Inventors: Jay Yuan Zhang, Ballwin, MO (US); Timothy A Niemeyer, Fenton, MO (US)

(73) Assignee: DAP Products Inc., Baltimore, MD (US)

( * ) Notice: Subject to any disclaimer, the term of this patent is extended or adjusted under 35 U.S.C. 154(b) by 0 days.

(21) Appl. No.: 15/556,682

(22) PCT Filed: Apr. 8, 2016

(86) PCT No.: PCT/US2016/026569
§ 371 (c)(1),
(2) Date: Sep. 8, 2017

(87) PCT Pub. No.: WO2016/164671
PCT Pub. Date: Oct. 13, 2016

(65) Prior Publication Data
US 2018/0079881 A1  Mar. 22, 2018

Related U.S. Application Data

(60) Provisional application No. 62/146,042, filed on Apr. 10, 2015.

(51) Int. Cl.
*C08J 9/14* (2006.01)
*C08G 18/76* (2006.01)
*C08G 18/22* (2006.01)
*C08G 18/24* (2006.01)
*C08G 18/48* (2006.01)
*C08G 18/20* (2006.01)
*C08G 18/16* (2006.01)
*C08G 18/38* (2006.01)
*C08G 101/00* (2006.01)

(52) U.S. Cl.
CPC .......... *C08J 9/146* (2013.01); *C08G 18/163* (2013.01); *C08G 18/2027* (2013.01); *C08G 18/225* (2013.01); *C08G 18/227* (2013.01); *C08G 18/24* (2013.01); *C08G 18/3819* (2013.01); *C08G 18/4804* (2013.01); *C08G 18/7664* (2013.01); *C08J 9/144* (2013.01); *C08J 9/149* (2013.01); *C08G 2101/00* (2013.01); *C08G 2190/00* (2013.01); *C08J 2201/022* (2013.01); *C08J 2203/142* (2013.01); *C08J 2203/162* (2013.01); *C08J 2203/182* (2013.01); *C08J 2207/04* (2013.01); *C08J 2375/06* (2013.01); *C08J 2375/08* (2013.01)

(58) Field of Classification Search
CPC .............. C08G 18/163; C08G 18/2027; C08G 18/225; C08G 18/227; C08G 18/24; C08G 18/3819; C08G 18/4804; C08G 18/7664; C08G 2101/00; C08G 2190/00; C08J 9/144; C08J 9/146; C08J 9/149; C08J 2201/022; C08J 2203/142; C08J 2203/162; C08J 2203/182; C08J 2207/04; C08J 2375/06; C08J 2375/08
See application file for complete search history.

(56) References Cited

U.S. PATENT DOCUMENTS

| 6,375,096 B1* | 4/2002 | Rashidi ............... B01F 13/002 239/413 |
| 7,672,295 B1 | 3/2010 | Andhare et al. |
| 2010/0048754 A1 | 2/2010 | Abraham et al. |
| 2012/0088856 A1† | 4/2012 | Glos |
| 2012/0248371 A1 | 10/2012 | Ross et al. |
| 2014/0171525 A1 | 6/2014 | Yu et al. |

FOREIGN PATENT DOCUMENTS

| FR | 2921664 A1 † | 4/2009 |
| WO | 2012/115929 A2 † | 8/2012 |
| WO | 2012115929 A2 | 8/2012 |
| WO | WO-2016/164671 A1 | 10/2016 |

OTHER PUBLICATIONS

International Search Report and Written Opinion dated Jul. 12, 2017 by the International Searching Authority of Patent Application No. PCT/US2016/026569, which was filed on Apr. 8, 2016 and published as WO 2016/164671 on Oct. 13, 2016 (Inventor—Zhang et al.; Applicant—DAP Products, Inc.) (9 pages).
International Preliminary Report on Patentability completed on Oct. 10, 2017 by the International Searching Authority of Patent Application No. PCT/US2016/026569, which was filed on Apr. 8, 2016 and published as WO 2016/164671 dated Oct. 13, 2016 (Inventor—Zhang et al.; Applicant—DAP Products, Inc.) (7 pages).
AU, 2016244865 (2016244865), Apr. 8, 2016 (Sep. 28, 2017), Jay Yuan Zhang (DAP Products, Inc.).
BR, BR1120170215306, Apr. 8, 2016, Jay Yuan Zhang (DAP Products, Inc.).

(Continued)

*Primary Examiner* — John M Cooney
(74) *Attorney, Agent, or Firm* — Armstrong Teasdale LLP

(57) ABSTRACT

A formulation technology for low pressure two component polyurethane foam-funning compositions containing gaseous hydrohaloolefin blowing agents is described with improved storage stability and extended shelf-life. The "B"-side component of the formulations contain a gaseous hydrohaloolefin blowing agent and a polyol pre-mix, the polyol pre-mix comprising liquid blowing agent, polyol, and a catalyst containing at least one catalytic metal compound.

21 Claims, 2 Drawing Sheets

(56) References Cited

OTHER PUBLICATIONS

CA, 2979749 (2979749), Apr. 8, 2016 (Oct. 13, 2016), Jay Yuan Zhang (DAP Products, Inc.).
EP, 16720227.4, Sep. 12, 2017, Jay Yuan Zhang (DAP Products, Inc.).
MX, MX/A/2017/012956, Apr. 8, 2016, Jay Yuan Zhang (DAP Products, Inc.).
PCT, PCT/US2016/026569 (WO 2016/164671), Apr. 8, 2016 (Oct. 13, 2016), Jay Yuan Zhang (DAP Products, Inc.).

\* cited by examiner
† cited by third party

STABLE TWO COMPONENT SPRAY FOAM COMPOSITIONS CONTAINING HYDROHALOOLEFIN PROPELLANT OR BLOWING AGENT

CROSS-REFERENCE TO RELATED APPLICATIONS

This application is a U.S. National Phase Application of International Patent Application No. PCT/US2016/026569, filed Apr. 8, 2016, which claims priority to U.S. Provisional Patent Application No. 62/146,042, filed Apr. 10, 2015, both of which are herein incorporated by reference in their entireties.

A new abstract page on a separate sheet in accordance with 37 C.F.R. § 1.72 is attached hereto.

Appendix: Abstract page

FIELD OF THE INVENTION

The present invention generally relates to foam-forming compositions of low pressure two component polyurethane spray foam. More particularly, the invention relates to such compositions including a hydrohaloolefin as a gaseous blowing agent, propellant, and/or liquid blowing agent in the "B"-side component.

BACKGROUND OF THE INVENTION

Polyurethane spray foams and their methods of manufacture are well known. Briefly, the polyurethane polymer is formed by an exothermic chemical reaction between a polyisocyanate and a polyol. This polymerization reaction is typically catalyzed by tertiary amine catalysts and organometallic catalysts. The resulting polymer becomes foam if it is formulated with a blowing agent, in which case the formation of gas bubbles occurs at the same time as urethane polymerization. If water is used as a chemical blowing agent, gaseous carbon dioxide will be produced by the chemical reaction between isocyanates and water. Alternatively, low boiling point liquids can be added as physical blowing agents that are chemically unreactive, but are vaporized by the heat generated by the polymerization reaction. Furthermore, a properly selected liquefied gas can also be used as a physical blowing agent and it will act as a propellant if it has an adequate vapor pressure at the desired temperature range. Surfactants in the foam forming composition stabilize the growing bubbles (cells) and regulate their size. Gas bubbles in the polymer expand upon reduction of pressure in the system, and remain trapped within the cells of the foam. The initial liquid foam cures to a cellular material ranging from a flexible to a rigid foam.

Typically, low pressure two component polyurethane spray foams are formed from two-component systems, commonly referred to as an "A" side and a "B" side, that react when they are mixed. Component "A" contains a diisocyanate or a polyisocyanate with or without a blowing agent or further additives, and component "B" generally contains gaseous blowing agent/propellant and a polyol pre-mix. The polyol pre-mix contains a polyol having two or more hydroxyl groups, tertiary amine catalysts, organometallic catalysts, liquid blowing agent, and water. The "A"-side and "B" side components may include surfactants and other additives. The two components are packaged and stored in separate containers (pressure rated, such as a cylinder or aerosol can) or stored in separate compartments within the same container. Typically, the components of the "A" side and the components of the "B" side are delivered though separate lines into a dispensing unit, such as an impingement mixing or static mixing type spray gun, at a ratio of around 1:1 by weight. In a system with two separate containers, the two components are kept separate throughout this entire system until they come together in the mixing section of the dispensing unit, such as a mixing nozzle or mixing chamber. When dispensed, the liquid contents come out as frothed foam which reacts and cures to form the cellular polyurethane polymer. The spray foam industry in the United States traditionally regards the isocyanate component as "A" side and the component containing polyol as "B" side. The "A" and "B" designations may be reversed in other areas such as Europe.

The gaseous blowing agents or propellants, hydrofluorocarbons (HFCs), currently used in typical low pressure two component polyurethane spray foams are "third generation" blowing agents. The shelf life of current conventional low pressure polyurethane spray foam compositions containing HFCs is at least 6 months, typically 12 months or longer.

Hydrohaloolefins (HHOs) such as hydrofluoroolefins (HFOs) are being developed as "fourth generation" blowing agents because they have been shown to have less global-warming potential than HFCs. Mandates are proposed or now exist in the United States, Canada and Europe to ban the use of HFCs in spray foam compositions. However, there are challenges in formulating a low pressure two-component foam forming composition containing an HHO that is storage stable (i.e., the composition has desired shelf-life stability). Storage stable systems are those having desired chemical reactivity (e.g., having desired gel time and/or tack free time), and being able to produce foams with quality and performance as designed throughout the expected storage life.

SUMMARY OF THE INVENTION

A two-component polyurethane spray foam-forming composition is provided. The composition comprises an "A"-side component and a "B"-side component. The "A"-side component comprises a polyisocyanate and an optional "A"-side blowing agent. The "B"-side component comprises a polyol premix, and a gaseous "B"-side blowing agent comprising a hydrohaloolefin. The polyol pre-mix comprises a polyol, a metal catalyst, and a liquid "B"-side blowing agent. The polyol pre-mix contains less than 1 wt. % nitrogen (% N) as determined by ASTM D 6979-14.

A two-component polyurethane spray foam-forming composition is also provided. The composition comprises an "A"-side component and a "B"-side component. The "A"-side component comprises a polyisocyanate and an optional "A"-side blowing agent. The "B"-side component consists essentially of a polyol premix, and a gaseous "B"-side blowing agent comprising a hydrohaloolefin. The polyol pre-mix consists essentially of a polyol, a metal catalyst, and a liquid "B"-side blowing agent.

A polyurethane foam prepared from the two-component polyurethane spray foam-forming composition is also provided.

A two component polyurethane foam system is also provided. The system comprises an "A"-side container containing the "A"-side component of the composition and having a valve for dispensing the "A"-side component; and a "B"-side container containing the "B"-side component of the composition and having a valve for dispensing the "B"-side component.

Another two component polyurethane foam system is provided. The system comprises an "A"-side container containing the "A"-side component of the composition and a "B"-side container containing the "B"-side component of the composition, and a valve for dispensing the composition. The "B"-side container is housed within the "A"-side container.

Other objects and features will be in part apparent and in part pointed out hereinafter.

DESCRIPTION OF THE PREFERRED EMBODIMENTS

Figure 1:
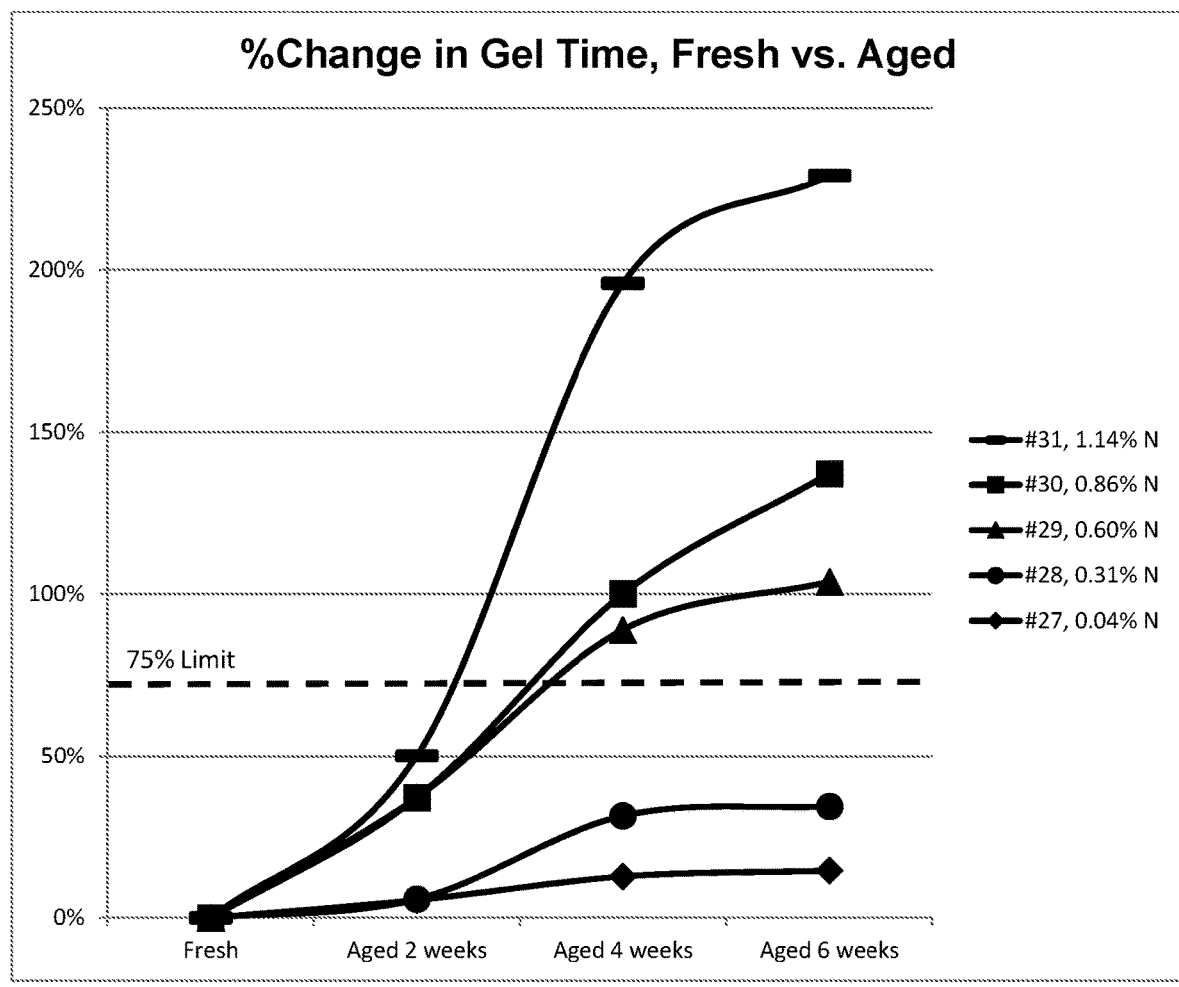
FIG. 1 depicts percentage change in gel time as a function of time for compositions aged at 120° F. (49° C.) and having nitrogen content (% N) as determined by ASTM D 6979-14 of 0.04 wt. % (-♦-), 0.31 wt. % (-●-), 0.60 wt. % (-▲-), 0.86 wt. % (-■-), and 1.14 wt. % (——).

Hydrohaloolefins (HHOs) such as hydrofluoroolefins (HFOs) are being developed as "fourth generation" blowing agents because they have been shown to have less global-warming potential than HFCs. However, when the HFCs of a conventional two component polyurethane spray foam composition are substituted with HHOs, the storage stability of the composition was significantly and adversely affected, the observed shelf life changed to days or weeks, rather than several months to one year or more. This occurred when a hydrohaloolefin gaseous and/or liquid blowing agent was in the "B"-side component.

This problem was solved with a low pressure two-component polyurethane spray foam-forming composition as provided herein. The composition comprises an "A"-side component and a "B"-side component. The "A"-side component comprises a polyisocyanate and an "A"-side blowing agent. The "B"-side component comprises a polyol premix and a gaseous "B"-side blowing agent. The gaseous "B"-side blowing agent comprises a hydrohaloolefin (HHO). It was discovered that the stability problem could be solved by minimizing or eliminating any amine content in the "B"-side component of the composition. The amine content can be expressed in terms of nitrogen content (% nitrogen) and determined by ASTM D 6979-14.

The "B"-side component can consist essentially of the polyol premix and the gaseous "B"-side blowing agent.

"Consisting essentially of" as used herein means that the specified component of the composition includes the specified ingredients as well as additional unspecified ingredients provided that the unspecified ingredients do not materially affect the basic and novel characteristics of the composition. More specifically, the unspecified ingredients cannot include an amount of an amine-containing compound such as amine catalysts or amino polyols that would adversely affect the storage stability (shelf life) of the composition as compared to the same composition which does not include any amine-containing compound in the polyol pre-mix when stored under the same conditions. For example, for a low pressure two component polyurethane spray foam composition, it is preferred that the composition is stable for about six months, and preferably about 7, 8, 9, 10, 11, 12 months or more, when stored in two component spray foam containers of "A" side component and "B" side component at room temperature (77° F. (25° C.)) and a pressure of 800 psi (5516 kPa) or less, typically 300 psi (2068 kPa) or less. It has been discovered that such compositions have the desired shelf life when the polyol pre-mix of the "B"-side component has a nitrogen content not exceeding 1 wt. % based on the weight of the polyol pre-mix as determined by ASTM D 6979-14. Preferably the polyol premix has a nitrogen content not exceeding 0.9, 0.8, 0.7, 0.6, 0.5, 0.4, 0.3, 0.2, 0.1, 0.09, 0.08, 0.07, 0.06, or 0.05 wt. % based on the weight of the polyol pre-mix. As another example for a low pressure two component polyurethane spray foam composition, it is preferred that the composition undergoes no more than a 75% change in chemical reactivity when the composition is stored at a temperature of 120° F. (49° C.) for a time period of six weeks as compared to the chemical reactivity of the composition at the time of manufacture as measured under the same conditions, preferably no more than a 70% change. When the chemical reactivity comprises gel time, the composition can exhibit an increase in gel time of not more than 75% when the composition is stored at a temperature of 120° F. (49° C.) for a time period of six weeks as compared to the gel time of the composition at the time of manufacture as measured under the same conditions, preferably no more than a 70% increase. When the chemical reactivity comprises tack-free time, the composition can exhibit an increase in tack-free time of not more than 75% when the composition is stored at a temperature of 120° F. (49° C.) for a time period of six weeks as compared to the tack-free time of the composition at the time of manufacture as measured under the same conditions, preferably no more than a 70% increase.

Each week that a composition is stored at a temperature of 120° F. (49° C.) is equivalent to one month of storing the composition under ambient temperature (i.e., 77° F. (25° C.)). For example, a composition exhibiting an increase in tack-free time of not more than 75% when the composition is stored at a temperature of 120° F. (49° C.) for a time period of six weeks is equivalent to a composition having the same tack-free time after six months storage at ambient temperature.

The polyol pre-mix comprises a polyol, a metal catalyst, and a liquid "B"-side blowing agent. The polyol pre-mix can consist essentially of a polyol, a metal catalyst, and a liquid "B"-side blowing agent.

Blowing agents of the composition are described as gas or liquid based on the state of the blowing agent at ambient temperature and pressure (e.g., at 77° F. (25° C.) and one atmosphere).

Preferably, the polyol pre-mix contains 0 to about 30 wt. % of the "B"-side liquid blowing agent, about 0.1 to about 10 wt. % of the metal catalyst, and about 60 to about 99.9 wt. % of the polyol based on the total weight of the polyol pre-mix. More preferably, the polyol pre-mix contains about 0.1 to about 15 wt. % of the "B"-side liquid blowing agent, about 0.2 to about 5 wt. % of the metal catalyst, and about 60 to about 99.7 wt. % of the polyol based on the total weight of the polyol pre-mix. Most preferably, the polyol pre-mix contains about 1 to about 12 wt. % of the "B"-side liquid blowing agent, about 0.5 to about 2 wt. % of the metal catalyst, and about 60 to about 98.5 wt. % of the polyol based on the total weight of the polyol pre-mix.

The polyol pre-mix can further comprise from about 0.1 to about 10 wt. % surfactant, preferably about 0.5 to about 5 wt. % surfactant, and more preferably about 1 to about 3 wt. % surfactant.

The polyol pre-mix can contain less than 1 wt. % nitrogen based on the weight of the polyol pre-mix. Preferably the polyol premix has a nitrogen content not exceeding 0.9, 0.8, 0.7, 0.6, 0.5, 0.4, 0.3, 0.2, 0.1, 0.09, 0.08, 0.07, 0.06 or 0.05 wt. % based on the weight of the polyol pre-mix, and more preferably a nitrogen content not exceeding 0.1 wt. % based on the weight of the polyol pre-mix. The nitrogen content of the polyol pre-mix can be determined by ASTM D 6979-14. For a completely formulated "B" side component composition, the nitrogen content of the polyol pre-mix can be determined by a sample preparation process and ASTM D 6979-14. One example of the sample preparation process can be described as follows: spray only the "B"-side component into a container, wait until the gaseous blowing agent is completely released and only the polyol pre-mix remains in the container, and analyze nitrogen content by ASTM D 6979-14.

The "B"-side component can consist essentially of a polyol premix, and a gaseous "B"-side blowing agent comprising a hydrohaloolefin.

The "A"-side component can comprise 0 to 20 wt. % blowing agent and about 80 to 100 wt. % polyisocyanate, preferably from about 0.1 to 20 wt. % blowing agent and about 80 to about 99.9 wt. % polyisocyanate.

The composition may undergo no more than a 75% change in chemical reactivity when the composition is stored at a temperature of 120° F. (49° C.) for a time period of six weeks as compared to the chemical reactivity of the composition at the time of manufacture as measured under the same conditions, preferably no more than a 70% change.

When the chemical reactivity comprises gel time, the composition can exhibit an increase in gel time of not more than 75% when the composition is stored at a temperature of 120° F. (49° C.) for a time period of six weeks as compared to the gel time of the composition at the time of manufacture as measured under the same conditions, preferably no more than a 70% increase.

When the chemical reactivity comprises tack-free time, the composition can exhibit an increase in tack-free time of not more than 75% when the composition is stored at a temperature of 120° F. (49° C.) for a time period of six weeks as compared to the tack-free time of the composition at the time of manufacture as measured under the same conditions, preferably no more than a 70% increase.

The composition at the time of manufacture is generally known as a "fresh" composition, as referenced in the examples below.

The composition can be in the form of any commercially available low pressure two component polyurethane spray foam system grade including, but not limited to, fast set spray foam systems which typically have a gel time up to 60 seconds, and slow rise spray foam systems which typically have a gel time up to 200 seconds.

The weight ratio of "A"-side component to "B"-side component in the composition can range from about 0.8:1 to about 1.4:1.

One or more blowing agents may be used in the compositions; the blowing agent may function as a propellant as well. Desirably, the blowing agent is non-reactive with other ingredients in the "A"-side or "B"-side component, is environmentally friendly, has little or zero ozone depletion potential, and little global warming potential.

The "A"-side blowing agent can comprise a gaseous blowing agent, such as a hydrohaloolefin, carbon dioxide, nitrogen, compressed air, a hydrocarbon, a halogenated hydrocarbon, a hydrofluorocarbon (e.g., 1,1-difluoroethane (HFC 152a)), or a combination thereof. Preferably, gaseous "A"-side blowing agent comprises 1,3,3,3-tetrafluoropropene (HFO 1234ze) in an amount of about 5 to 12 wt. %. Nitrogen gas can be included as a gaseous "A"-side blowing agent to adjust the pressure of the "A"-side canister.

The "A"-side blowing agent can comprise a liquid blowing agent, for example, to reduce the viscosity of the "A"-side component of the composition. The liquid blowing agent can comprise a gas-generating material suitable for a polyurethane foam-forming composition.

The liquid "A"-side blowing agent can comprise, but is not limited to, a hydrohaloolefin, a hydrochlorofluoroolefin (e.g., trans-1-chloro-,3,3,3-trifluoropropene (HFO 1233zd); (Z)-1,1,1,4,4,4-hexafluoro-2-butene (HFO 1336mzz; OPTEON® 1100 from Chemours)), a chloroalkene (e.g., trans-1,2-dichloroethylene (TDCE)), a fluorocarbon, an alkoxyalkane (e.g., dimethoxymethane (methylal)), an alkyl alkanoate (e.g., methyl formate (ECOMATE® blowing agent), ethyl acetate), a hydrocarbon (e.g., propane, butane, isobutane, pentane, isopentane, cyclopentane), a dialkyl ether, a chlorocarbon (e.g., 1,1,1-trichloroethane, dichloropropane), a chlorofluorocarbon (e.g., dichlorodifluoromethane (CFC-12), trichlorotrifluoroethane (CFC-113), dichlorotetrafluoroethane (CFC-114)), a hydrofluorocarbon, difluoromethane (HFC-32), pentafluoroethane (HFC-125), 1,1,2,2,-tetrafluoroethane (HFC-134), 1,1,1,2-tetrafluoroethane (HFC-134a), 1,2-difluoroethane (HFC-142), 1,1,1,3,3-pentafluoropropane (HFC-245fa)), a hydrochlorofluorocarbon (e.g., chlorodifluoromethane (HCFC-22), 1,1-dichloro-2,2,2-trifluoroethane (HCFC-123), 1-chloro-1,1-difluoroethane (HCFC-142b)), an ether (e.g., furan, dimethyl ether, diethyl ether), an ester, an aldehyde, a ketone (e.g., acetone, methyl ethyl ketone), or a combination thereof.

When the gaseous "A"-side or "B"-side blowing agent comprises the hydrohaloolefin, the hydrohaloolefin can comprise 1,3,3,3-tetrafluoropropene (HFO 1234ze); 2,3,3,3-tetrafluoroprop-1-ene (HFO 1234yf); 1,1,3,3-tetrafluoropropene; 1,2,3,3,3-pentafluoropropene (HFO 1225ye); 3,3,3-trifluoropropene; 1,1,1,3,3-pentafluoropropene (HFO 1225zc); 1,1,2,3,3-pentafluoropropene (HFO 1225yc); (Z)-1,1,1,2,3-pentafluoropropene (HFO 1225yez); or a combination thereof. Preferably, the hydrohaloolefin of the gaseous "A"-side or "B"-side blowing agent, or both, comprises 1,3,3,3-tetrafluoropropene (HFO 1234ze).

The "A"-side component contains 0 to about 20 wt. % of the blowing agent based on the total weight of the "A"-side component, and preferably from about 0.1 to 15 wt. %.

The gaseous "B"-side blowing agent can further comprise nitrogen, a hydrocarbon, a halogenated hydrocarbon, a hydrofluorocarbon (e.g., 1,1-difluoroethane (HFC 152a)), or a combination thereof.

The liquid "B"-side blowing agent can comprise a gas-generating material suitable for a polyurethane foam-forming composition.

The liquid "B"-side blowing agent can comprise water, a hydrohaloolefin, a hydrochlorofluoroolefin (e.g., trans-1-chloro-,3,3,3-trifluoropropene (HFO 1233zd); (Z)-1,1,1,4,4,4-hexafluoro-2-butene (HFO 1336mzz)), a chloroalkene (e.g., trans-1,2-dichloroethylene (TDCE)), a fluorocarbon (e.g., 1,1,1,3,3-pentafluoropropane (HFC 245fa)), an alkoxyalkane (e.g., dimethoxymethane (methylal)), an alkyl alkanoate (e.g., methyl formate (ECOMATE® blowing agent)), a hydrocarbon, a dialkyl ether, a chlorocarbon, a chlorofluorocarbon, a hydrofluorocarbon, a hydrochlorofluorocarbon, an ether, an ester, an aldehyde, a ketone, or a combination thereof.

The "B"-side component contains about 0.1 to about 30 wt. % of the blowing agent based on the total weight of the "B"-side component, preferably about 5 to about 25 wt. %, and more preferably about 12 to about 22 wt. %.

The "B"-side liquid blowing agent can further comprise about 0.1 to about 15 wt. % water based on the total weight of the polyol pre-mix, and preferably about 0.5 to about 2 wt. % water.

The polyol of the polyol-premix can be free of any amine. As used herein, "polyol" refers to a molecule that has an average of greater than 1.0 hydroxyl group per molecule.

The polyol can comprise a polyether polyol, a polyester polyol, a polybutadiene polyol, a polycaprolactone polyol, a polycarbonate polyol, a hydroxyl-terminated polyolefin polyol, a graft polyol, a polyol derived from a natural source, or a combination thereof. The polyol can be used individually or in the form of mixtures.

The polyols generally have a molecular weight range of from 200 to 6000, more preferably from 250 to 2000, and most preferably from 250 to 1000.

The polyols can have a hydroxyl number (OH number) ranging from 28 to 800 mg/KOH g. Hydroxyl number indicates the number of reactive hydroxyl groups available and is expressed as the number of milligrams of potassium hydroxide equivalent to the hydroxyl content of one gram of the polyol sample.

The polyols can have a number average hydroxyl functionality (Fn) of about 6.2 or less. Number average hydroxyl functionality refers to the average number of pendant hydroxyl groups (primary, secondary, or tertiary) that are present on a molecule of the polyol.

Preferably, the polyols are substantially free of amine content, as determined by ASTM D 6979-14. The nitrogen content of the polyols cannot exceed the maximum nitrogen content of the polyol pre-mix as described herein.

Preferably, the polyol comprises a polyether polyol, a polyester polyol, or a combination thereof.

Suitable polyether polyols include sucrose, glycerin, and sorbitol-based polyols which are commercially available.

In additional to polyols derived from petrochemicals, the polyols for use in the present invention may be derived from a natural source, such as fish oil, lard, tallow, and plant oil (see for example, US2010/048754 and U.S. Pat. No. 7,672,295). Plant based polyols may be made from any plant oil or oil blends containing sites of unsaturation, including, but not limited to, soybean oil, castor oil, palm oil, canola oil, linseed oil, rapeseed oil, sunflower oil, safflower oil, olive oil, peanut oil, sesame seed oil, cotton seed oil, walnut oil, and tung oil.

Examples of commercially available polyols suitable for use in the present invention include, but are not limited to, Voranol® 230-660 from Dow Chemical (Midland, Mich.), Arcol® F-3022 from Covestro (Leverkusen, Germany), and Pluracol® GP730 from BASF (Florham Park, N.J.), as well as polyester polyols from various manufacturers including Stepan Company, Invista, and Oxid (Huntsman).

The polyisocyanate of the "A"-side component can comprise an aliphatic polyisocyanate, a cycloaliphatic polyisocyanate, or an aromatic polyisocyanate, or a combination thereof. The polyisocyanates can be used individually or in the form of mixtures.

Exemplary aliphatic and cycloaliphatic isocyanates include hexamethylene diisocyanate (HDI), isophorone diisocyanate (IPDI), cyclohexane diisocyanate (CHDI), and dicyclohexylmethane-4,4'-diisocyanate (H12MDI), and isomers and oligomers thereof.

When the polyisocyanate comprises an aromatic polyisocyanate, the aromatic polyisocyanate can comprise toluene diisocyanate (TDI), phenylene diisocyanate, naphthalene 1,5-diisocyanate (NDI), methylene diphenyl diisocyanate (MDI), polymeric methylene diphenyl diisocyanate (PMDI), triphenylmethane triisocyanate, or isomers or mixtures thereof. Preferably, the aromatic polyisocyanate comprises MDI, PMDI, or a mixture thereof. For example, the polyisocyanate can comprise about 25 to 75 wt. % MDI, or about 30 to 70 wt. % MDI.

The number of isocyanate groups in PMDI is preferably 2.1 to 3.2, and more preferably 2.3 to 2.9.

Polyisocyanates for use in polyurethane systems are well known and commercially available. Examples include, but are not limited to, Rubinate® M from Huntsman Corporation (Salt Lake City, Utah), Lupranate® M20S from BASF (Florham Park, N.J.), Mondur® MR from Covestro (Leverkusen, Germany), and PAPI™ 27 from Dow Chemical (Midland, Mich.). Any conventional polyisocyanate used in polyurethane foams can be selected.

The "A"-side component, the "B"-side component, or both the "A"-side and the "B"-side component can further comprise a surfactant.

The surfactant can comprise a non-siloxane surfactant suitable for use in polyurethane compositions including alkoxylate, ethoxylate, poly- and monoglucoside, as well as anionic or nonionic materials. Examples of commercially available surfactants in this category include Dabco® LK-221 and LK-443, from Air Products, Triton® X-15 and X-100, Tergitol® NP-4, NP-9 and NP-10 from Dow Chemical (Midland, Mich.), and Surfonic® N-95 from Huntsman Corporation (Salt Lake City, Utah).

The surfactant can comprise a siloxane surfactant. Examples of suitable siloxane surfactants are polydimethylsiloxane and polyether-polysiloxane copolymers. Siloxane surfactants provide rapid emulsification of the polyurethane reactants.

Examples of commercially available siloxane surfactants include Dabco® DC series 193 from Air Products and Chemicals, Inc. (Allentown, Pa.), Tegostab® B series B8407, B8404 from Evonik Goldschmidt Chemical Corporation (Hopewell, Va.), Silstab® S2000, S2580, S2850 from Siltech (Toronto, Canada), and Niax® surfactants L5340, L5420, L6900 from Momentive Performance Materials (Albany, N.Y.).

The polyol pre-mix includes a metal catalyst, which is used to accelerate the polyurethane polymerization reaction.

The metal catalyst can comprise an inorganic or organic compound based on metals, such as tin, bismuth, potassium, zinc, zirconium, magnesium, aluminum, sodium, copper, iron, cobalt, or a combination thereof.

When the metal catalyst comprises tin, the metal catalyst can comprise a tin carboxylate, a tin thioglycerol, a tin mercaptide, or a combination thereof.

When the metal catalyst includes a tin carboxylate, the tin carboxylate can comprise dimethyltin dineodecanoate (e.g., Fomrez® UL-28 or Reaxis® C-325), dibutyltin dilaurate (e.g., Fomrez® SUL-4), dioctyltin dineodecanoate (e.g., Fomrez® UL-38), dimethyltin dioleate (e.g., Fomrez® UL-50), dioctyltin dilaurate (e.g., Fomrez® UL-59), dibutyltin diacetate, stannous octoate, dibutyltin di(2-ethylhexoate), dimethyltin dilaurate, or a combination thereof.

When the metal catalyst includes a tin mercaptide, the tin mercaptide can comprise dibutyltin dilaurylmercaptide (e.g., Fomrez® UL-1, Reaxis® C319, Dabco® T-120), or a combination thereof.

When the metal catalyst includes a tin thioglycerol, the tin thioglycerol can comprise dibutyltin bis(1-thioglycerol (e.g., Reaxis® C-227, Fomrez® UL-6), or a combination thereof.

When the metal catalyst comprises bismuth, the metal catalyst can comprise a bismuth carboxylate, bismuth nitrate, a bismuth halide (e.g., bismuth chloride, bismuth bromide, and bismuth iodide), bismuth sulfide, or a combination thereof.

When the metal catalyst includes a bismuth carboxylate, the bismuth carboxylate can comprise bismuth acetate, bismuth oleate, bismuth octoate, bismuth neodecanoate, bismuth decanoate, bismuth stearate, bismuth subgallate, bismuth subsalicylate, bismuth tris(2-ethyl-hexaoctoate), or a combination thereof.

When the metal catalyst comprises potassium, the metal catalyst can comprise a potassium carboxylate such as potassium octoate (e.g., Dabco® K-15), potassium acetate (e.g., Polycat® 46), or a combination thereof. Other suitable potassium catalysts include Dabco® TMR-20.

When the metal catalyst comprises zirconium, the metal catalyst can comprise a zirconium carboxylate.

When the metal catalyst comprises magnesium, the metal catalyst can comprise a magnesium carboxylate.

The metal catalyst can comprise aluminum.

When the metal catalyst comprises sodium, the metal catalyst can comprise a sodium carboxylate such as sodium octoate or sodium acetate.

When the metal catalyst comprises zinc, the metal catalyst can comprise a zinc carboxylate such as zinc octoate.

When the metal catalyst comprises copper, the metal catalyst can comprise a copper carboxylate.

When the metal catalyst comprises iron, the metal catalyst can comprise a ferric carboxylate.

The metal catalyst can comprise cobalt such as cobalt naphthenate.

Preferably, the "B" component of the composition contains a combination of metal catalysts. It has been discovered that the overall amount of metal catalyst required to be effective can be minimized by using combinations of the metal catalysts described herein. It is preferred to include a synergistically effective amount of a combination of metal catalysts in the composition.

A "synergistically effective amount" as used herein represents a quantity of a combination of at least two metal catalysts as described herein that is more effective in the composition in terms of achieving desirable chemical reactivity (e.g., gel time and/or tack free time) than the same amount of either of the metal catalysts alone. For example, an amount is synergistically effective if a combination of 1 wt. % of metal catalyst A and 1 wt. % of metal catalyst B in the composition achieves a faster gel time and/or tack free time than when the composition includes 2 wt. % of metal catalyst A or 2 wt. % of metal catalyst B.

A quantity of a combination of at least two metal catalysts as described herein can be effective in the composition in terms of achieving desirable chemical reactivity (e.g., gel time and/or tack free time) than an amount that is about 5, 10, 15, 20, 25, 30, 35, 40, 45, 50, 55, 60, 65, 70, 75, 80, 85, 90, 95, 100% more than the same amount of either of the metal catalysts alone. For example, an amount is synergistically effective if a combination of 1 wt. % of metal catalyst A and 1 wt. % of metal catalyst B in the composition achieves a faster gel time and/or tack free time than when the composition includes 3 wt. % of metal catalyst A or 3 wt. % of metal catalyst B (i.e., 50% more than the same amount of catalyst A alone or catalyst B alone).

The present invention comprises compositions containing each and every combination of each of the metal catalysts mentioned herein. For example regarding combinations of two metal carboxylate catalysts, the metal catalyst can comprise a tin carboxylate and a bismuth carboxylate, a tin carboxylate and a zinc carboxylate, a tin carboxylate and a zirconium carboxylate, a tin carboxylate and a magnesium carboxylate, a tin carboxylate and a sodium carboxylate, a tin carboxylate and a copper carboxylate, a tin carboxylate and a ferric carboxylate, a tin carboxylate and a cobalt carboxylate, a bismuth carboxylate and a potassium carboxylate, a bismuth carboxylate and a zinc carboxylate, a bismuth carboxylate and a zirconium carboxylate, a bismuth carboxylate and a magnesium carboxylate, a bismuth carboxylate and a sodium carboxylate, a bismuth carboxylate and a copper carboxylate, a bismuth carboxylate and a ferric carboxylate, a bismuth carboxylate and a cobalt carboxylate, a potassium carboxylate and a zinc carboxylate, a potassium carboxylate and a zirconium carboxylate, a potassium carboxylate and a magnesium carboxylate, a potassium carboxylate and a sodium carboxylate, a potassium carboxylate and a copper carboxylate, a potassium carboxylate and a ferric carboxylate, a potassium carboxylate and a cobalt carboxylate, a zinc carboxylate and a zirconium carboxylate, a zinc carboxylate and a magnesium carboxylate, a zinc carboxylate and a sodium carboxylate, a zinc carboxylate and a copper carboxylate, a zinc carboxylate and a ferric carboxylate, a zinc carboxylate and a cobalt carboxylate, a zirconium carboxylate and a magnesium carboxylate, a zirconium carboxylate and a sodium carboxylate, a zirconium carboxylate and a copper carboxylate, a zirconium carboxylate and a ferric carboxylate, a zirconium carboxylate and a cobalt carboxylate, a magnesium carboxylate and a sodium carboxylate, a magnesium carboxylate and a copper carboxylate, a magnesium carboxylate and a ferric carboxylate, a magnesium carboxylate and a cobalt carboxylate, a sodium carboxylate and a copper carboxylate, a sodium carboxylate and a ferric carboxylate, a sodium carboxylate and a cobalt carboxylate, a copper carboxylate and a ferric carboxylate, a copper carboxylate and a cobalt carboxylate, or a ferric carboxylate and a cobalt carboxylate.

Examples of synergistically effective catalyst combinations can include, but are not limited to, a metal catalyst combination comprising a tin carboxylate and a potassium carboxylate. The tin carboxylate can comprise dimethyltin dineodecanoate and the potassium carboxylate can comprise potassium octoate, or the tin carboxylate can comprise dimethyltin dineodecanoate and the potassium carboxylate can comprise potassium acetate.

The composition can further comprise other additives including, but not limited to, a flame retardant, a plasticizer, a moisture scavenger, a colorant, an acid scavenger, an ion scavenger, a solvent, or a combination thereof. The additives are generally mixed with the polyol as part of the polyol premix in the preparation of the compositions.

In low pressure two-component foam forming compositions, the "A"-side and "B"-side are prepared and packaged in separate containers for dispensing. To prepare the "A"-side, a dispensing container is charged with the polyisocyanate, optional blowing agent and/or other additives. To prepare the "B"-side, a polyol premix is prepared by combining polyol, metal catalyst, liquid blowing agent, optional surfactant, and optional additives at room temperature. The "B" side dispensing container is charged with the polyol pre-mix and a gaseous blowing agent.

Preferably, the compositions are placed into containers at low pressure, such as up to 800 psi (5516 kPa), preferably about 50 psi (344 kPa) to about 300 psi (2068 kPa).

A two component polyurethane foam system is also provided. The system comprises an "A"-side container containing the "A"-side component of the composition and having a valve for dispensing the "A"-side component; and a "B"-side container containing the "B"-side component of the composition and having a valve for dispensing the "B"-side component. The containers are typically pressurized cylinders or pressurized cans. Such containers and valves are well known in the art. Before the foam is applied to the desired surfaces, the two dispensing containers are connected with suitable hoses that allow the two components to mix through a dispensing unit, such as an impingement mixing or static mixing type spray gun and be applied.

Another two component polyurethane foam system comprises an "A"-side container containing the "A"-side component of the composition and a "B"-side container containing the "B"-side component of the composition, and a valve for dispensing the composition. The "B"-side container is typically housed within the "A"-side container. The "A"-side container is typically a pressurized canister such as an aerosol can.

The compositions described herein can be useful for any known low pressure two component polyurethane foam application. The two component spray foams are suitable for various applications including, but not limited to, roof or wall insulation, air sealing, and cavity filling.

Having described the invention in detail, it will be apparent that modifications and variations are possible without departing from the scope of the invention defined in the appended claims.

EXAMPLES

The following non-limiting examples are provided to further illustrate the present invention.

Examples 1-4

The two component low pressure polyurethane spray foam-forming compositions were prepared from the components as listed in the tables below. The shelf-life stability of "B"-side component for a two component spray foam system is determined based on its chemical reactivity changes when the "B" side component is aged under either actual storage conditions or accelerated storage conditions for certain period of time. Both gel-time and tack-free time can be used to represent the chemical reactivity of the system. A stable system as defined herein undergoes no more than 75% change in chemical reactivity after being aged, while also maintaining its foam quality and density, as compared to the composition at the time of manufacture as measured under the same conditions. When the chemical reactivity comprises gel time, the composition can exhibit an increase in gel time of not more than 75% when the composition is stored at a temperature of 120° F. (49° C.) for a time period of 2, 4, and/or 8 weeks as compared to the gel time of the composition at the time of manufacture as measured under the same conditions. When the chemical reactivity comprises tack-free time, the composition can exhibit an increase in tack-free time of not more than 75% when the composition is stored at a temperature of 120° F. (49° C.) for a time period of 2, 4 and/or 8 weeks as compared to the tack-free time of the composition at the time of manufacture as measured under the same conditions.

To carry out accelerated shelf-life stability testing, the chemical reactivity data were obtained on both fresh and aged sample containers. The mixtures of all ingredients of "A"-side and "B"-side components were prepared separately in different containers. The containers were then charged with nitrogen to appropriate pressure, typically about 110 psi (758 kPa) at 72° F. (22° C.). An un-aged pair of "A"-side and "B"-side component containers was sprayed through a low pressure spray foam applicator at about a 1:1 mixing ratio at standard laboratory conditions. The actual chemical reactivity and foam density were recorded as "fresh sample" (i.e., the sample at the time of manufacture).

A series of "A"-side and "B"-side component samples were prepared in different containers using the same chemicals at the same time as the fresh samples, except that the "B"-side component containers were charged with nitrogen to a pressure of about 70 psi (483 kPa) at 72° F. (22° C.). The "B"-side containers were aged at 120° F. (49° C.) in an oven for various aging times as noted in the tables below, up to 8 weeks. At the end of each aging period, the containers were removed from the oven and allowed to cool to ambient temperature for 24 hours before being pressurized to about 110 psi (758 kPa) with nitrogen. These containers were then paired with "A"-side component containers and sprayed the same way as the fresh samples. The chemical reactivity and foam density were recorded for each aging period.

The compositions of Examples 1 to 4 are conventional low pressure two component spray polyurethane foam-forming compositions containing more than 1 wt. % nitrogen in the polyol pre-mix due to the amount of amino polyols and/or amine catalyst in the polyol pre-mix of these compositions. However, these conventional compositions had HFO-1233zd substituted for the liquid blowing agent of the "B"-side component (Examples 1-3), and HFO-1234ze substituted for the gaseous blowing agent/propellant of the "A"-side and "B"-side components (Examples 1-4). Example 4 included HFC-245fa, a liquid blowing agent known to provide good shelf-life stability in polyurethane compositions. Examples 1, 3 and 4 included organic tin catalysts, and Example 2 included a bismuth catalyst. All of these compositions had severe shelf-life instability in accelerated storage testing at 120° F. (49° C.), as evidenced by significant % change in gel time or tack free time as compared to fresh samples.

|  | Example | | | |
|---|---|---|---|---|
|  | 1 | 2 | 3 | 4 |
|  | COMPOSITION | | | |
|  | Parts by wt. | Parts by wt. | Parts by wt. | Parts by wt. |
| "A" Component | | | | |
| Polymeric MDI with surfactant | 120.0 | 120.0 | 120.0 | 120.0 |
| HFO-1234ze gaseous blowing agent/propellant | 15.6 | 15.6 | 15.6 | 15.6 |

-continued

|  | Example | | | |
|---|---|---|---|---|
|  | 1 | 2 | 3 | 4 |
|  | COMPOSITION | | | |
|  | Parts by wt. | Parts by wt. | Parts by wt. | Parts by wt. |
| "B" Component | | | | |
| Amino polyol 1 | 24 | 24 | 24 | 24 |
| Amino polyol 2 | 2.5 | 2.5 | 2.5 | 2.5 |
| Polyether polyol 1 | 17 | 17 | 17 | 17 |
| Polyether polyol 2 | 37.5 | 37.5 | 37.5 | 37.5 |
| Flame Retardant | 15.35 | 15.35 | 15.35 | 15.35 |
| Silicone surfactant | 1.5 | 1.5 | 1.5 | 1.5 |
| Water | 0.9 | 0.9 | 0.9 | 0.9 |
| Liquid blowing agent | HFO-1233zd 6.7 | HFO-1233zd 6.7 | HFO-1233zd 6.7 | HFC 245fa 6.4 |
| HFO-1234ze gaseous blowing agent/propellant | 26.7 | 26.7 | 26.7 | 21.8 |
| Catalyst | Tin #1 | Bismuth #1 | Tin #2 | Tin #2 |
| % Catalyst | 0.65 | 0.65 | 0.65 | 0.65 |
| % N content in polyol pre-mix | 1.28% | 1.28% | 1.28% | 1.29% |
| Fresh Sample | | | | |
| Gel Time, sec | 19 | 19 | 28 | 18 |
| Tack Free Time, sec | 30 | 52 | 50 | 30 |
| Foam Density, pet (lb/ft³) | 1.9 | 2.1 | 1.8 | 2.2 |
| Sample Aged 2 weeks @ 120° F. (49° C.) | | | | |
| Gel Time, sec | 30 | 65 | 44 | 29 |
| Tack Free Time, sec | 58 | 135 | 101 | 58 |
| Foam Density, pet | 2.2 | 2.5 | 2.0 | 2.2 |
| Gel time change vs fresh | 58% | 242% | 57% | 61% |
| Tack Free time change vs fresh | 93% | 160% | 102% | 93% |
| Foam density change vs fresh | 14% | 20% | 8% | 4% |
| Sample Aged 4 weeks @ 120° F. (49° C.) | | | | |
| Gel Time, sec | 77 | 114 | 91 | n/a |
| Tack Free Time, sec | 152 | 220 | 210 | n/a |
| Foam Density, pet | 2.1 | 2.6 | 2.4 | n/a |
| Gel time change vs fresh | 305% | 500% | 225% | n/a |
| Tack Free time change vs fresh | 407% | 323% | 320% | n/a |
| Foam density change vs fresh | 13% | 24% | 29% | n/a |
| Sample Aged 8 weeks @ 120° F. (49° C.) | | | | |
| Gel Time, sec | n/a | 100 | 86 | n/a |
| Tack Free Time, sec | n/a | 210 | 175 | n/a |
| Foam Density, pcf | n/a | 2.3 | 2.3 | n/a |
| Gel time change vs fresh | n/a | 426% | 207% | n/a |
| Tack Free time change vs fresh | n/a | 304% | 250% | n/a |
| Foam density change vs fresh | n/a | 12% | 25% | n/a |
| Shelf-life stability, weeks @ 120° F. (49° C.) | approx. 2 | less than 2 | approx. 2 | approx. 2 | n/a means not available.

Examples 5-9

Compositions were prepared as described above in Examples 1-4. The compositions of Examples 5-9 contained less amino polyol as compared to the compositions of Examples 1-4. The compositions of Examples 5 and 6 included amine and metal catalysts, while the compositions of Examples 7-9 included only metal catalysts. The compositions of Examples 5 and 6 which included the amine catalysts had severe shelf-life instability in accelerated storage testing at 120° F. (49° C.), as evidenced by significant % change in gel time or tack free time as compared to fresh samples. Foam density data collected indicate small changes in foam density for these examples. The compositions of Examples 7-9 were stable and had desirable shelf life, as evidenced by no significant % change in gel time or tack free time as compared to fresh samples.

|  | Example | | | | |
|---|---|---|---|---|---|
|  | 5 | 6 | 7 | 8 | 9 |
|  | COMPOSITION | | | | |
|  | Parts by wt. | Parts by wt. | Parts by wt. | Parts by wt. | Parts by wt. |
| "A" Component | | | | | |
| Polymeric MDI with surfactant | 120.0 | 120.0 | 120.0 | 120.0 | 120.0 |
| HFO-1234ze gaseous blowing agent/propellant | 15.6 | 15.6 | 15.6 | 15.6 | 15.6 |
| "B" Component | | | | | |
| Amino polyol | 2.5 | 2.5 | 2.5 | 2.5 | 2.5 |
| Polyether polyol 1 | 17 | 17 | 17 | 17 | 17 |
| Polyether polyol 2 | 24 | 24 | 24 | 24 | 24 |
| Polyether polyol 3 | 35.2 | 34.8 | 36 | 36 | 35.6 |
| Flame Retardant | 14.8 | 14.7 | 15 | 15 | 14.9 |
| Siloxane surfactant | 1.5 | 1.5 | 1.5 | 1.5 | 1.5 |
| Water | 0.9 | 0.9 | 0.9 | 0.9 | 0.9 |
| HFO-1233zd liquid blowing agent | 6.4 | 6.4 | 6.4 | 6.4 | 6.4 |
| HFO-1234ze gaseous blowing agent/propellant | 21.8 | 21.8 | 21.8 | 21.8 | 21.8 |
| Tin Catalyst #1 | 0.5 | 1 | 2.5 | 2.5 | 0 |
| Tin Catalyst #2 | 0 | 0 | 0 | 0 | 3 |
| Imidazole Catalyst | 3 | 0 | 0 | 0 | 0 |
| Amine Catalyst DMDEE | 0 | 3 | 0 | 0 | 0 |
| % N content in polyol premix | 0.92% | 0.43% | 0.10% | 0.10% | 0.10% |
| Fresh Sample | | | | | |
| Gel Time, sec | 21 | 32 | 30 | 30 | 33 |
| Tack Free Time, sec | 31 | 46 | 45 | 42 | 46 |
| Foam Density, pet | 2.2 | 2.2 | 2.2 | 2.4 | 2.4 |
| Sample Aged 2 weeks @ 120° F. (49° C.) | | | | | |
| Gel Time, sec | 75 | 46 | 34 | 33 | 33 |
| Tack Free Time, sec | 120 | 61 | 45 | 46 | 52 |
| Foam Density, pet | 2.6 | 2.4 | 2.4 | 2.7 | 2.4 |
| Gel time change vs fresh | 257% | 44% | 13% | 10% | 0% |
| Tack Free time change vs fresh | 287% | 33% | 0% | 10% | 13% |
| Foam density change vs fresh | 20% | 10% | 8% | 9% | 1% |
| Sample Aged 4 weeks @ 120° F. (49° C.) | | | | | |
| Gel Time, sec | 86 | 51 | 33 | 33 | 34 |
| Tack Free Time, sec | 141 | 62 | 52 | 46 | 48 |
| Foam Density, pet | n/a | n/a | n/a | 2.5 | 2.3 |
| Gel time change vs fresh | 310% | 59% | 10% | 10% | 3% |
| Tack Free time change vs fresh | 355% | 35% | 16% | 10% | 4% |
| Foam density change vs fresh | n/a | n/a | n/a | 4% | −2% |
| Sample Aged 8 weeks @ 120° F. (49° C.) | | | | | |
| Gel Time, sec | 101 | 114 | 46 | 43 | 40 |
| Tack Free Time, sec | 171 | 160 | 66 | 55 | 51 |
| Foam Density, pet | n/a | n/a | n/a | 2.6 | 2.3 |
| Gel time change vs fresh | 381% | 256% | 53% | 43% | 21% |
| Tack Free time change vs fresh | 452% | 248% | 47% | 31% | 11% |
| Foam density change vs fresh | n/a | n/a | n/a | 9% | −3% |
| Shelf-life stability, weeks @ 120° F. (49° C.) | less than 2 | approx. 4 | approx. 8 | great than 8 | much greater than 8 | n/a means not available.

Examples 10-16

Compositions were prepared as described above in Examples 1-4. The compositions of Examples 10-16 contained no amino polyols or amine catalysts, and the polyol pre-mix has 0% nitrogen per ASTM D 6979-14. The compositions were stable and had desirable shelf life, as evidenced by no significant % change in gel time or tack free time after aging at 120° F. (49° C.) as compared to fresh samples. The foam densities of these examples were between 2 and 3 pcf and showed little change during accelerated aging testing.

Examples 18-26

Compositions were prepared as described above in Examples 1-4. The compositions of Examples 18-26 contained no amino polyols or amine catalysts, and the polyol pre-mix had 0% nitrogen per ASTM D 6979-14. Synergy is known to occur for certain combinations of amine catalysts and metal catalysts. However a synergistic effect between only metal catalysts was observed in these examples. A synergistic effect was observed such that the amount of catalyst could be reduced from 2.8-5.0 wt. % for a single

| | Example | | | | | | |
|---|---|---|---|---|---|---|---|
| | 10 | 11 | 12 | 13 | 14 | 15 | 16 |
| | COMPOSITION | | | | | | |
| | Parts by wt. | Parts by wt. | Parts by wt. | Parts by wt. | Parts by wt. | Parts by wt. | Parts by wt. |
| "A" Component | | | | | | | |
| Polymeric MDI with surfactant | 100 | 100 | 100 | 100 | 100 | 100 | 100 |
| HFO-1234ze gaseous blowing agent/propellant | 13 | 13 | 13 | 13 | 13 | 11.7 | 11.7 |
| "B" Component | | | | | | | |
| Polyether polyol 1 | 20 | 20 | 20 | 20 | 20 | 20 | 20 |
| Polyether polyol 2 | 24 | 24 | 24 | 24 | 24.5 | 24 | 24 |
| Polyether polyol 3 | 35.6 | 35.6 | 35.6 | 34.4 | 35.3 | 44.1 | 44.1 |
| Flame Retardant | 14.9 | 14.9 | 14.9 | 14.6 | 14.8 | 6 | 6 |
| Siloxane surfactant | 1.5 | 1.5 | 1.5 | 1.5 | 1.5 | 1.5 | 1.5 |
| Water | 0.9 | 0.9 | 0.9 | 0.9 | 1.2 | 1.2 | 1.2 |
| HFO-1233zd liquid blowing agent | 6.4 | 6.4 | 6.4 | 6.4 | 6.4 | 6.4 | 6.4 |
| HFO-1234ze gaseous blowing agent/propellant | 21.8 | 21.8 | 21.8 | 21.8 | 21.8 | 21.8 | 21.8 |
| First catalyst type | Tin #1 | Tin #3 | Tin #4 | Bismuth #2 | Tin #1 | Tin #1 | Tin #1 |
| % catalyst | 2.5 | 2.5 | 2.5 | 4 | 0.5 | 0.5 | 0.5 |
| Second catalyst type | n/a | n/a | n/a | n/a | Potassium #1 | Potassium #2 | Potassium #3 |
| % catalyst | n/a | n/a | n/a | n/a | 1.5 | 2 | 2 |
| % N content in polyol premix (excluding gas blowing agent) | 0% | 0% | 0% | 0% | 0% | 0% | 0% |
| Fresh Sample | | | | | | | |
| Gel Time, sec | 37 | 31 | 42 | 20 | 38 | 49 | 38 |
| Tack Free Time, sec | 47 | 43 | 57 | 33 | 54 | 77 | 58 |
| Foam Density, pcf | 2.7 | 2.6 | 2.7 | 2.5 | 2.0 | 2.0 | 2.0 |
| Sample Aged 2 weeks @ 120° F. (49° C.) | | | | | | | |
| Gel Time, sec | 36 | 32 | 36 | 30 | 32 | 39 | 34 |
| Tack Free Time, sec | 49 | 55 | 49 | 46 | 53 | 72 | 60 |
| Foam Density, pcf | 2.6 | 2.4 | 2.5 | 3.0 | 2.1 | 2.0 | 2.1 |
| Gel time change vs fresh | −3% | 3% | −14% | 50% | −16% | −20% | −11% |
| Tack Free time change vs fresh | 4% | 28% | −14% | 39% | −2% | −6% | 3% |
| Foam density change vs fresh | −2% | −6% | −6% | 17% | 5% | 2% | 6% |
| Sample Aged 4 weeks @ 120° F. (49° C.) | | | | | | | |
| Gel Time, sec | 31 | 39 | 36 | 29 | 33 | 46 | 35 |
| Tack Free Time, sec | 47 | 60 | 50 | 55 | 47 | 58 | 46 |
| Foam Density, pcf | 2.6 | 2.5 | 2.5 | 3.1 | 2.1 | 2.2 | 2.2 |
| Gel time change vs fresh | −16% | 26% | −14% | 45% | −13% | −6% | −8% |
| Tack Free time change vs fresh | 0% | 40% | −12% | 67% | −13% | −25% | −21% |
| Foam density change vs fresh | −3% | −2% | −5% | 21% | 7% | 12% | 10% |
| Sample Aged 8 weeks @ 120° F. (49° C.) | | | | | | | |
| Gel Time, sec | 32 | 50 | 35 | 25 | 55 | 61 | 45 |
| Tack Free Time, sec | 45 | 64 | 50 | 52 | 89 | 80 | 60 |
| Foam Density, pcf | 2.6 | 2.5 | 2.8 | 3.0 | 2.2 | 2.2 | 2.1 |
| Gel time change vs fresh | −14% | 61% | −17% | 25% | 44.7% | 24.5% | 18.4% |
| Tack Free time change vs fresh | −4% | 49% | −12% | 58% | 64.8% | 3.9% | 3.4% |
| Foam density change vs fresh | −2% | −4% | 4% | 17% | 10% | 11% | 5% |
| Shelf-life stability, weeks @ 120° F. (49° C. | much greater than 8 | approx. 8 | much greater than 8 | much greater than 8 | approx. 8 | much greater than 8 | much greater than 8 | n/a means not available.

metal catalyst to only about 1.5 wt. % combined for two metal catalysts as shown in the table below. The synergistic effect can occur between more than two metal catalysts. In order to observe the synergistic effect, gel time and tack free time were tested on fresh samples and listed in the following table.

|  | Example | | | | | | | | |
|---|---|---|---|---|---|---|---|---|---|
|  | 18 | 19 | 20 | 21 | 22 | 23 | 24 | 25 | 26 |
|  | COMPOSITION | | | | | | | | |
|  | Parts by wt. | Parts by wt. | Parts by wt. | Parts by wt. | Parts by wt. | Parts by wt. | Parts by wt. | Parts by wt. | Parts by wt. |
| "A" Component | | | | | | | | | |
| Polymeric MDI with surfactant | 120.0 | 120.0 | 120.0 | 120.0 | 120.0 | 120.0 | 120.0 | 120.0 | 120.0 |
| HFO-1234ze gaseous blowing agent/propellant | 15.6 | 15.6 | 15.6 | 15.6 | 15.6 | 15.6 | 15.6 | 15.6 | 15.6 |
| "B" Component Base formula for "B" component | | | | | | | | | |
| Polyether polyol 1 | 17.0 | 17.0 | 17.0 | 17.0 | 17.0 | 17.0 | 17.0 | 17.0 | 17.0 |
| Polyether polyol 2 | 26.5 | 26.5 | 26.5 | 26.5 | 26.5 | 26.5 | 26.5 | 26.5 | 26.5 |
| Polyether polyol 3 | 37.5 | 37.5 | 37.5 | 37.5 | 37.5 | 37.5 | 37.5 | 37.5 | 37.5 |
| Flame Retardant | 15.4 | 15.4 | 15.4 | 15.4 | 15.4 | 15.4 | 15.4 | 15.4 | 15.4 |
| Siloxane surfactant | 1.5 | 1.5 | 1.5 | 1.5 | 1.5 | 1.5 | 1.5 | 1.5 | 1.5 |
| Water | 0.9 | 0.9 | 0.9 | 0.9 | 0.9 | 0.9 | 0.9 | 0.9 | 0.9 |
| HFO-1233zd liquid blowing agent | 6.7 | 6.7 | 6.7 | 6.7 | 6.7 | 6.7 | 6.7 | 6.7 | 6.7 |
| HFO-1234ze gaseous blowing agent/propellant | 26.7 | 26.7 | 26.7 | 26.7 | 26.7 | 26.7 | 26.7 | 26.7 | 26.7 |
| Catalyst(s) | | | | | | | | | |
| Potassium #2 | 0 | 0 | 0 | 0 | 2.80 | 1.00 | 1.00 | 0 | 0 |
| Potassium #3 | 0 | 0 | 0 | 2.80 | 0 | 0 | 0 | 0 | 1.00 |
| Potassium #1 | 0 | 0 | 5.00 | 0 | 0 | 0 | 0 | 0.80 | 0 |
| Tin #1 | 0 | 2.80 | 0 | 0 | 0 | 0 | 0.75 | 0.75 | 0.65 |
| Tin #2 | 3.00 | 0 | 0 | 0 | 0 | 1.00 | 0 | 0 | 0 |
| Gel Time (sec) | 68 | 43 | 65 | 266 | 216 | 36 | 40 | 38 | 39 |
| Tack Free Time (sec) | 82 | 54 | 78 | 338 | 262 | 46 | 55 | 48 | 49 |
| Foam Density (pcf) | 2.3 | 2.5 | 2.3 | 2.2 | 2.3 | 2.2 | 2.3 | 2.3 | 2.3 |

Examples 27-31

Figure 2:
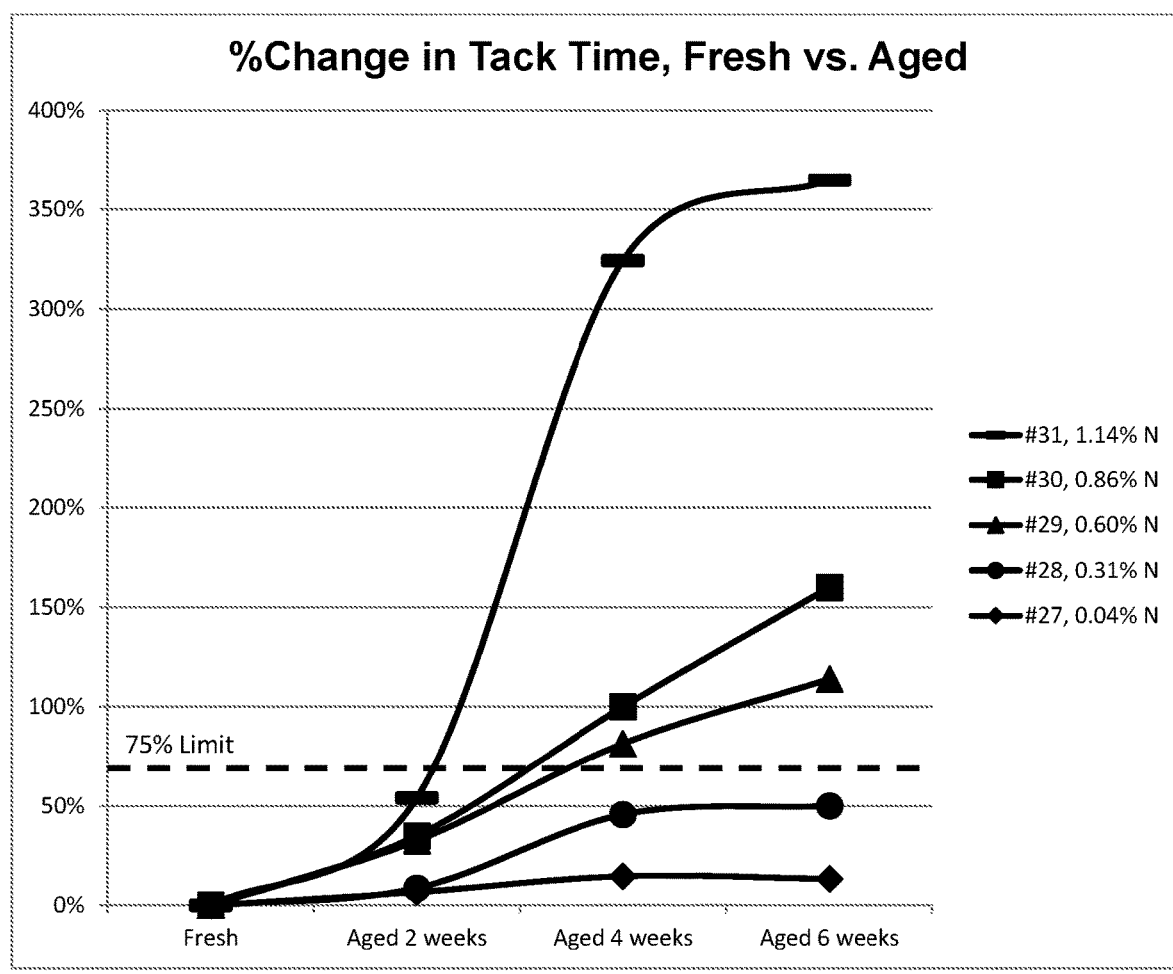
FIG. 2 depicts percentage change in tack time as a function of time for compositions aged at 120° F. (49° C.) and having nitrogen content as determined by ASTM D 6979-14 of 0.04 wt. % (-♦-), 0.31 wt. % (-●-), 0.60 wt. % (-▲-), 0.86 wt. % (-■-), and 1.14 wt. % (——).

Compositions were prepared as described above in Examples 1-4. The compositions of Examples 27-31 were made the same way, with the only change being the amount of amino polyol to achieve a specific % N when measured per ASTM D 6979-14. None of these compositions contained an amine catalyst. All compositions were heat-aged at 120° F. (49° C.) for 2, 4, and 6 weeks. The compositions showed markedly different changes in reactivities, both gel time and tack free time. These changes were shown to be dependent on the % N of the polyol pre-mix, as displayed in FIGS. 1 and 2. The foam densities of these examples were between 2 and 3 pcf and showed little change during accelerated aging testing.

|  | Example | | | | |
|---|---|---|---|---|---|
|  | 27 | 28 | 29 | 30 | 31 |
|  | COMPOSITION | | | | |
|  | Parts by wt. | Parts by wt. | Parts by wt. | Parts by wt. | Parts by wt. |
| "A" Component | | | | | |
| Polymeric MDI with surfactant | 121.4 | 121.4 | 121.4 | 121.4 | 121.4 |
| HFO-1234ze gaseous blowing agent/propellant | 14.3 | 14.3 | 14.3 | 14.3 | 14.3 |
| "B" Component | | | | | |
| Amino Polyol | 0 | 5 | 10 | 15 | 20 |
| Polyether polyol 1 | 41.8 | 36.8 | 31.8 | 26.8 | 21.8 |

|  | Example | | | | |
|---|---|---|---|---|---|
|  | 27 | 28 | 29 | 30 | 31 |
|  | COMPOSITION | | | | |
|  | Parts by wt. | Parts by wt. | Parts by wt. | Parts by wt. | Parts by wt. |
| Polyether polyol 2 | 10 | 10 | 10 | 10 | 10 |
| Polyether polyol 3 | 37 | 37.4 | 38 | 38.5 | 38.8 |
| Flame Retardant | 5 | 5 | 5 | 5 | 5 |
| Siloxane surfactant | 1.5 | 1.5 | 1.5 | 1.5 | 1.5 |
| Water | 1.2 | 1.2 | 1.2 | 1.2 | 1.2 |
| HFO-1233zd liquid blowing agent | 6.4 | 6.4 | 6.4 | 6.4 | 6.4 |
| HFO-1234ze gaseous blowing agent/propellant | 21.8 | 21.8 | 21.8 | 21.8 | 21.8 |
| Metal Catalyst | 2.5 | 2.1 | 1.5 | 1 | 0.7 |
| % N content in polyol premix | 0.04% | 0.31% | 0.60% | 0.86% | 1.14% |
| Fresh Sample | | | | | |
| Gel Time, sec | 55 | 35 | 27 | 27 | 24 |
| Tack Free Time, sec | 75 | 46 | 43 | 40 | 37 |
| Foam Density, pcf | 2.5 | 2.5 | 2.4 | 2.3 | 2.1 |
| Sample Aged 2 weeks @ 120° F. (49° C.) | | | | | |
| Gel Time, sec | 58 | 37 | 37 | 37 | 36 |
| Tack Free Time, sec | 80 | 50 | 57 | 54 | 57 |
| Foam Density, pcf | 2.4 | 2.5 | 2.3 | 2.2 | 2.2 |
| Gel time change vs fresh | 5% | 6% | 37% | 37% | 50% |
| Tack Free time change vs fresh | 7% | 9% | 33% | 35% | 54% |
| Sample Aged 4 weeks @ 120° F. (49° C.) | | | | | |
| Gel Time, sec | 62 | 46 | 51 | 54 | 71 |
| Tack Free Time, sec | 86 | 67 | 78 | 80 | 157 |
| Foam Density, pcf | 2.5 | 2.6 | 2.6 | 2.3 | 2.5 |
| Gel time change vs fresh | 13% | 31% | 89% | 100% | 196% |
| Tack Free time change vs fresh | 15% | 46% | 81% | 100% | 324% |
| Sample Aged 6 weeks @ 120° F. (49° C.) | | | | | |
| Gel Time, sec | 63 | 47 | 55 | 64 | 79 |
| Tack Free Time, sec | 85 | 69 | 92 | 104 | 172 |
| Foam Density, pcf | 2.6 | 2.5 | 2.5 | 2.4 | 2.4 |
| Gel time change vs fresh | 15% | 34% | 104% | 137% | 229% |
| Tack Free time change vs fresh | 13% | 50% | 114% | 160% | 365% |
| Shelf-life stability, weeks @120° F. (49° C.) | much greater than 6 weeks | greater than 6 weeks | less than 4 weeks | less than 4 weeks | less than 4 weeks |

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description shall be interpreted as illustrative and not in a limiting sense.

What is claimed is:

1. A two-component polyurethane spray foam-forming composition, comprising:
   an "A"-side component comprising:
      a polyisocyanate; and
      an "A"-side blowing agent comprising a gaseous blowing agent or a liquid blowing agent; and
   a "B"-side component comprising:
      a polyol pre-mix, wherein the polyol pre-mix comprises an amino polyol, a metal catalyst, and a liquid "B"-side blowing agent, wherein the polyol pre-mix does not exceed 0.4 wt. % nitrogen as determined by ASTM D6979-14; and
      a gaseous "B"-side blowing agent comprising a hydrohaloolefin.

2. The composition of claim 1,
   wherein the "B"-side component consists essentially of:
      the polyol pre-mix; and
      the gaseous "B"-side blowing agent comprises a hydrohaloolefin.

3. The composition of claim 1, wherein the "A"-side blowing agent comprises a gaseous blowing agent, the gaseous blowing agent selected from the group consisting of a hydrohaloolefin, carbon dioxide, nitrogen, compressed air, a hydrocarbon, a halogenated hydrocarbon, a hydrofluorocarbon, and combinations thereof.

4. The composition of claim 3, wherein the gaseous blowing agent comprises the hydrohaloolefin, and the hydrohaloolefin selected from the group consisting of 1,3,3,3-tetrafluoropropene (HFO 1234ze); 2,3,3,3-tetrafluoroprop-1-ene (HFO 1234yf); 1,1,3,3-tetrafluoropropene; 1,2,3,3,3-pentafluoropropene (HFO 1225ye); 3,3,3-trifluoropropene; 1,1,1,3,3-pentafluoropropene (HFO 1225zc); 1,1,2,3,3-pentafluoropropene (HFO 1225yc); (Z)-1,1,1,2,3-pentafluoropropene (HFO 1225yez); and combinations thereof.

5. The composition of claim 1, wherein the gaseous "B"-side blowing agent further comprises a compound selected from group consisting of nitrogen, a hydrocarbon, a halogenated hydrocarbon, a hydrofluorocarbon, and combinations thereof.

6. The composition of claim 1, wherein the liquid "B"-side blowing agent comprises a gas-generating material, or the "A"-side blowing agent comprises a liquid blowing agent, the liquid blowing agent comprising a gas-generating material.

7. The composition of claim 1, wherein the liquid "B"-side blowing agent comprises a compound selected from the group consisting of water, a hydrohaloolefin, a hydrochlorofluoroolefin, a chloroalkene, a fluorocarbon, an alkoxyalkane, an alkyl alkanoate, a hydrocarbon, a dialkyl ether, a chlorocarbon, a chlorofluorocarbon, a hydrofluorocarbon, a hydrochlorofluorocarbon, an ether, an ester, an aldehyde, a ketone, and combinations thereof.

8. The composition of claim 1, wherein the liquid "B"-side blowing agent comprises a compound selected from water, trans-1-chloro-3,3,3-trifluoropropene (HFO 1233zd); (Z)-1,1,1,4,4,4-hexafluoro-2-butene (HFO 1336mzz); trans-1,2-dichloroethylene (TDCE); 1,1,1,3,3-pentafluoropropane (HFC 245fa); dimethoxymethane (methylal); methyl formate; and combinations thereof.

9. The composition of claim 1, wherein the "A"-side blowing agent comprises a liquid blowing agent, the liquid blowing agent selected from the group consisting of a hydrohaloolefin, a hydrochlorofluoroolefin, a chloroalkene, a fluorocarbon, an alkoxyalkane, an alkyl alkanoate, a hydrocarbon, a dialkyl ether, a chlorocarbon, a chlorofluorocarbon, a hydrofluorocarbon, a hydrochlorofluorocarbon, an ether, an ester, an aldehyde, a ketone, and combinations thereof.

10. The composition of claim 1, wherein the liquid "A"-side blowing agent comprises a liquid blowing agent, the liquid blowing agent selected from the group consisting of trans-1-chloro-3,3,3-trifluoropropene (HFO 1233zd); (Z)-1,1,1,4,4,4-hexafluoro-2-butene (HFO 1336mzz); trans-1,2-dichloroethylene (TDCE); 1,1,1,3,3-pentafluoropropane (HFC 245fa); dimethoxymethane (methylal); methyl formate (ECOMATE® blowing agent); and combinations thereof.

11. The composition of claim 1, wherein the "A"-side component comprises from about 0.1 to about 20% by weight of the blowing agent, based on the total weight of the "A"-side component.

12. The composition of claim 1, wherein the "B"-side component comprises from about 0.1 to about 30% by weight of the blowing agent, based on the total weight of the "B"-side component.

13. The composition of claim 1, wherein the polyol pre-mix comprises greater than 0 to about 30 wt. % of the "B"-side liquid blowing agent, about 0.1 to about 10 wt. % of the metal catalyst, and about 60 to about 99.9 wt. % of the polyol, based on the total weight of the polyol pre-mix.

14. The composition of claim 1, wherein the polyol pre-mix further comprises a polyol selected from the group consisting of a polyether polyol, a polyester polyol, a polybutadiene polyol, a polycaprolactone polyol, a polycarbonate polyol, a hydroxyl-terminated polyolefin polyol, a graft polyol, a polyol derived from a natural source, and combinations thereof.

15. The composition of claim 1, wherein the polyisocyanate is selected from the group consisting of an aliphatic polyisocyanate, a cycloaliphatic polyisocyanate, or an aromatic polyisocyanate, and combinations thereof.

16. The composition of claim 1, wherein the metal catalyst is selected from the group consisting of tin, bismuth, potassium, zinc, zirconium, magnesium, aluminum, sodium, copper, iron, cobalt, and combinations thereof.

17. The composition of claim 1, wherein the metal catalyst is selected from the group consisting of a tin carboxylate, a tin thioglycerol, a tin mercaptide, a potassium carboxylate, and combinations thereof.

18. A polyurethane foam prepared from a composition of claim 1.

19. A two-component polyurethane foam system comprising an "A"-side container and a "B"-side container, wherein the "A"-side container contains the "A"-side component of the composition of claim 1, and wherein the "B"-side container contains the "B"-side component of the composition of claim 1, wherein "A"-side container has a valve for dispensing the "A"-side component; and the "B"-side container has a valve for dispensing the "B"-side component.

20. A two-component polyurethane foam system comprising an "A"-side container and a "B"-side container, wherein the "A"-side container contains the "A"-side component of the composition of claim 1, and wherein the "B"-side container contains the "B"-side component of the composition of claim 1, wherein the "B"-side container is housed within the "A"-side container, and wherein the "A"-side container has a valve for dispensing the composition.

21. The composition of claim 1, wherein the "A"-side component and the "B"-side component have a weight ratio of 0.8:1 to 1.4:1.

* * * * *